United States Patent
Song et al.

(10) Patent No.: US 11,347,679 B2
(45) Date of Patent: May 31, 2022

(54) HYBRID SYSTEM-ON-CHIP FOR POWER AND PERFORMANCE PREDICTION AND CONTROL

(71) Applicant: Alibaba Group Holding Limited, Grand Cayman (KY)

(72) Inventors: Jun Song, Tacoma, WA (US); Yi Liu, Hangzhou (CN); Lingling Jin, Sunnyvale, CA (US); Guan Wang, Hangzhou (CN); Ying Wang, Hangzhou (CN); Hong Tang, Kirkland, WA (US); Nan Zhang, Bellevue, WA (US); Zhengxiong Tian, Hangzhou (CN); Yu Zhou, Hangzhou (CN); Chao Qian, Hangzhou (CN); Shuiwang Liu, Hangzhou (CN); Jun Ruan, Hangzhou (CN); Bo Yang, Hangzhou (CN); Lin Yu, Hangzhou (CN); Jiangwei Huang, Hangzhou (CN); Hong Zhou, Hangzhou (CN); Yijun Lu, Seattle, WA (US); Ling Xu, Hangzhou (CN); Shiwei Li, Hangzhou (CN); Xiaolin Meng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 93 days.

(21) Appl. No.: 16/968,460

(22) PCT Filed: Feb. 8, 2018

(86) PCT No.: PCT/CN2018/078520
§ 371 (c)(1),
(2) Date: Aug. 7, 2020

(87) PCT Pub. No.: WO2019/153187
PCT Pub. Date: Aug. 15, 2019

(65) Prior Publication Data
US 2020/0401093 A1 Dec. 24, 2020

(51) Int. Cl.
*G05D 17/00* (2006.01)
*G06F 15/78* (2006.01)
(Continued)

(52) U.S. Cl.
CPC ....... *G06F 15/7807* (2013.01); *G05B 19/042* (2013.01); *G06F 3/064* (2013.01);
(Continued)

(58) Field of Classification Search
CPC ....... H04L 12/12; H04L 9/0618; G06F 3/064; G06F 9/4484; G06F 9/4881;
(Continued)

(56) References Cited

U.S. PATENT DOCUMENTS 7,281,145 B2 10/2007 Merkin et al.
7,921,313 B2 4/2011 Ghiasi et al.
(Continued)

FOREIGN PATENT DOCUMENTS

CN 101067758 A 11/2007

OTHER PUBLICATIONS

The Extended European Search Report dated Aug. 10, 2021 for European Patent Application No. 18904588.3, 5 pages.
(Continued)

*Primary Examiner* — Tuan A Vu
(74) *Attorney, Agent, or Firm* — Lee & Hayes, P.C.

(57) ABSTRACT

Systems and methods for a hybrid system-on-chip usable for predicting performance and power requirements of a host server include a big cores module, including central processing units, for receiving and pre-processing performance and power metrics data of the host server and to allocate computing resources, a small cores module, including massively parallel processing units, for mapping each instance associated with host server in the performance and power metrics data to a corresponding massively parallel process-
(Continued)

ing unit based on the allocated computing resources for a per-instance metrics calculation, and an artificial intelligence (AI) accelerator for calculating performance and power prediction results based on the per-instance calculations from the small cores module.

20 Claims, 10 Drawing Sheets

(51) Int. Cl.

| | | |
|---|---|---|
| *G05B 19/042* | (2006.01) | |
| *G06F 9/48* | (2006.01) | |
| *G06F 9/50* | (2006.01) | |
| *G06N 5/02* | (2006.01) | |
| *G06F 16/2458* | (2019.01) | |
| *G06F 3/06* | (2006.01) | |
| *G06F 9/448* | (2018.01) | |
| *H04L 12/12* | (2006.01) | |
| *H04L 9/06* | (2006.01) | |

(52) U.S. Cl.
CPC .......... *G06F 9/4484* (2018.02); *G06F 9/4881* (2013.01); *G06F 9/5011* (2013.01); *G06F 16/2471* (2019.01); *G06N 5/02* (2013.01); *G05B 2219/2639* (2013.01); *H04L 9/0618* (2013.01); *H04L 12/12* (2013.01)

(58) Field of Classification Search
CPC ............... G06F 9/5011; G06F 16/2471; G06F 15/7807; G05B 19/042; G06N 5/02
See application file for complete search history.

(56) References Cited

U.S. PATENT DOCUMENTS

| | | |
|---|---|---|
| 8,489,745 B2 | 7/2013 | Mandagere et al. |
| 8,650,423 B2 | 2/2014 | Li et al. |
| 8,775,839 B2 | 7/2014 | Cousson et al. |
| 8,799,693 B2 | 8/2014 | Vick et al. |
| 8,982,942 B2 | 3/2015 | Gao et al. |
| 9,268,611 B2 | 2/2016 | Iyer et al. |
| 9,286,222 B2 | 3/2016 | Greenhalgh |
| 9,413,619 B2 | 8/2016 | Akolkar et al. |
| 9,619,284 B2 | 4/2017 | Sakarda |
| 9,727,383 B2 | 8/2017 | Ballani et al. |
| 2009/0060197 A1* | 3/2009 | Taylor ............... H04L 9/0618 380/277 |
| 2013/0159745 A1 | 6/2013 | Barsness |
| 2014/0026111 A1* | 1/2014 | Stitt .................. G06F 9/4484 717/101 |
| 2014/0055496 A1* | 2/2014 | Cunningham ...... G06F 16/2471 345/660 |
| 2015/0244591 A1* | 8/2015 | Brown ................ H04L 12/12 709/223 |
| 2017/0366606 A1* | 12/2017 | Ben-Shaul .......... G06F 3/064 |
| 2018/0349191 A1* | 12/2018 | Dorsey ............... G06F 9/4881 |

OTHER PUBLICATIONS

The PCT Search Report dated Oct. 31, 2018 for PCT application No. PCT/CN2018/075820, 3 pages.
The PCT Written Opinion of the International Searching Authority dated Oct. 31, 2018 for PCT application No. PCT/CN2018/075820, 3 pages.

* cited by examiner

420

| Sample Window (Sec) | Workload Type | Input Power (W) | Ambient Temp (°C) | CPU ID | Turbo Frequncy (GHz) | Duration (Sec) | Residency (%) |
|---|---|---|---|---|---|---|---|
| 20 | A | 105 | 20 | 412 | 2.6 | 15.4 | 77 |
| | | | | | 2.7 | 4.4 | 22 |
| | | | | | 2.8 | 2.0 | 10 |
| | | | | 414 | 2.6 | 1.0 | 5 |
| | | | | | 2.7 | 16.6 | 83 |
| | | | | | 2.8 | 1.6 | 8 |
| | | | | | 2.9 | 0.8 | 4 |
| | | | | 416 | 2.6 | 0.0 | 0 |
| | | | | | 2.7 | 1.8 | 9 |
| | | | | | 2.8 | 10.0 | 50 |
| | | | | | 2.9 | 8.2 | 41 |
| | | | 30 | 412 | 2.6 | 16.5 | 82.5 |
| | | | | | 2.7 | 2.5 | 12.5 |
| | | | | | 2.8 | 1.0 | 5 |
| | | | | 414 | 2.5 | 2.0 | 10 |
| | | | | | 2.6 | 8.0 | 40 |
| | | | | | 2.7 | 9.0 | 45 |
| | | | | | 2.8 | 1.0 | 5 |
| | | | | 416 | 2.6 | 2.0 | 10 |
| | | | | | 2.7 | 4.0 | 20 |
| | | | | | 2.8 | 8.0 | 40 |
| | | | | | 2.9 | 6.0 | 30 |
| | | | ... | ... | ... | ... | ... |
| | | | T_Max | 412 | 2.6 | 15.0 | 75 |
| | | | | | 2.7 | 5.0 | 25 |
| | | | | | 2.8 | 0.0 | 0 |
| | | | | ... | ... | ... | ... |

FIG. 5A

| Sample Window (Sec) 502 | Workload Type 504 | Input Power (W) 506 | Ambient Temp (°C) 508 | CPU ID 510 | Turbo Frequency (GHz) 512 | Duration (Sec) 514 | Residency (%) 516 |
|---|---|---|---|---|---|---|---|
| 20 | A | 120 | 20 | 412 | 2.6 | 3.0 | 15 |
| | | | | | 2.7 | 4.0 | 20 |
| | | | | | 2.8 | 8.0 | 40 |
| | | | | | 2.9 | 5.0 | 25 |
| | | | | 414 | 2.6 | 0.5 | 2.5 |
| | | | | | 2.7 | 14.8 | 74 |
| | | | | | 2.8 | 2.5 | 12.5 |
| | | | | | 2.9 | 2.2 | 11 |
| | | | | 416 | 2.6 | 0.0 | 0 |
| | | | | | 2.7 | 3.0 | 15 |
| | | | | | 2.8 | 7.0 | 35 |
| | | | | | 2.9 | 10.0 | 50 |
| | | | 30 | 412 | 2.6 | 4.0 | 20 |
| | | | | | 2.7 | 5.0 | 25 |
| | | | | | 2.8 | 7.0 | 35 |
| | | | | | 2.9 | 4.0 | 20 |
| | | | | 414 | 2.5 | 0.0 | 0 |
| | | | | | 2.6 | 16.5 | 82.5 |
| | | | | | 2.7 | 2.0 | 10 |
| | | | | | 2.8 | 1.5 | 7.5 |
| | | | | 416 | 2.6 | 0.5 | 2.5 |
| | | | | | 2.7 | 5.5 | 27.5 |
| | | | | | 2.8 | 6.0 | 30 |
| | | | | | 2.9 | 8.0 | 40 |
| | | | ... | ... | ... | ... | ... |
| | | | T_Max | 412 | 2.6 | 18.0 | 90 |
| | | | | | 2.7 | 3.0 | 15 |
| | | | | | 2.8 | 0.0 | 0 |
| | | | | ... | ... | ... | ... |

HYBRID SYSTEM-ON-CHIP FOR POWER AND PERFORMANCE PREDICTION AND CONTROL

This Application claims the benefit of and is the National Stage of International Application No. PCT/CN18/075820, filed Feb. 8, 2018, which is incorporated herein by reference.

BACKGROUND

Workloads in cloud computing are generally unpredictable. Servers are fundamental computing units that cloud service providers provide for their customers. When the server utilization is high, its response time is more susceptible to workload surge, and the cloud service provider may not be able to meet the service level agreement (SLA). To alleviate problems associated with the workload surge, the central processing unit (CPU) frequency may be increased rapidly, for example. Static settings, such as letting CPUs constantly run at a very high frequency, may be also utilized to address the workload surge. Because the real-world workload surge would seldom saturate every core, requiring to run every core of the CPUs at the same frequency that is higher than the normal frequency might result in wasting excess energy and system stability. However, correctly and timely predicting the occurrence of the workload surge may be difficult.

To run the CPUs at a frequency that is higher than the normal frequency, a CPU turbo mode may be utilized, which may run the CPU at a "turbo" frequency. The "turbo" frequency may be guaranteed to be a thermal design power (TDP) frequency, but any frequencies above the TDP frequency may not be guaranteed. Turning on an opportunistic turbo switch in the CPU or in a system management menu, for example, in a Basic Input/Output System (BIOS), may not be sufficient to solve performance problems. Additionally, the turbo mode, i.e., being able to run the CPU at the turbo frequency, may not always be available. However, the cloud infrastructure as a service (IaaS) schedulers may need to know deterministic performance improvement ahead of time. For example, when two hyper threads start competing for a shared pipeline, the scheduler may need to know how much the CPU frequency may be increased.

Power, either DC or AC, is generally delivered to a rack that houses servers which share the same power source. Because the server utilization range may be dynamic and wide, its power consumption may also vary, for example, due to the increased CPU frequency in the turbo mode to meet the workload demand. Under certain circumstances, aggregated power consumption of all the servers in the same rack may be higher than the allowed maximum power consumption of the rack (Pmax_rack). If the duration of such high-power usage is longer than tolerance period (Tmax_power) of the rack circuitry, it may lead to destructive or catastrophic results such as overheating, power integrity problems, or power outage. To avoid such undesired results, the system may temporarily migrate the processes involved to different servers, however, a virtual machine (VM) or a container based virtualization services may be negatively affected by the migration. Any of these results may severely degrade the quality of the cloud computing services. However, considering the costs, using high-power racks for the same number of the servers or lowering the number of servers in the rack while keeping the same available maximum power may not acceptable to the cloud service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A and 5B illustrate example characterization databases listing characteristics of the CPUs in the servers.

DETAILED DESCRIPTION

Figure 1:
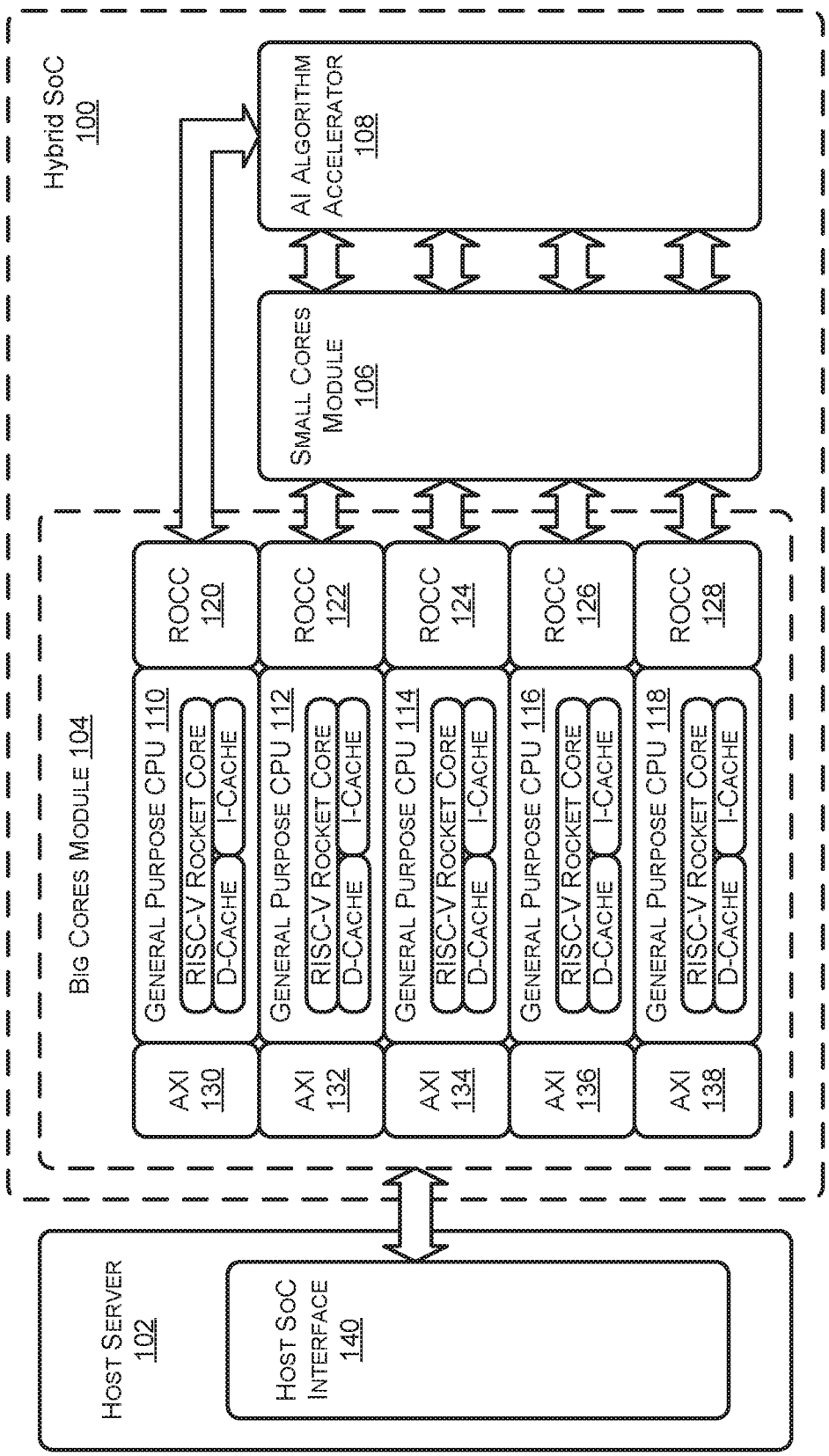
FIG. 1 illustrates an example block diagram of a hybrid system-on-chip (SoC) device that may be used for predicting the performance and power (PnP) requirements of a host server.

The systems and methods discussed herein are directed to central processing units (CPUs) in servers, and more specifically to predicting workloads of the servers, meeting the predicted workloads based on performance characterization of the CPUs, and supporting performance to meet the predicted workloads.

The systems and methods discussed herein are usable to predict performance and power (PnP) requirements of a host server using a hybrid system-on-chip (SoC) device which may be a component in the server. The hybrid SoC device may comprise a big cores module, a small cores module coupled to the big core module, and an artificial intelligence (AI) algorithm accelerator, which may also be referred as the AI accelerator, coupled to the big cores module and the small cores module. The big cores module may include a plurality of general purpose central processing units (CPUs) to receive and pre-process PnP metrics data of instances, such as virtual machines, containers, processes, jobs, tasks, and the like, of the host server, and the like, may allocate computing resources for calculating the PnP requirements. The small cores module may include a plurality of massively parallel processing (MPP) units to map each instance associated with the host server in the PnP metrics data to a corresponding MPP unit based on the allocated computing resources for a per-instance metric calculation. For example, a large double input matrix calculation may be handled by each small core performing an inversion calculation. The small cores module may also perform rule-based prediction, generate rule-based prediction results, and send the rule-based prediction results to big cores module. The rule-based prediction may include determining a state change in a monitored parameter, determining whether a threshold is met in a monitored parameter, generating a prediction based on the determination, and the like. The AI accelerator may calculate PnP prediction results based on the per-instance calculations from the small cores module and send the PnP prediction results to the big cores module. The hybrid SoC device may be coupled to the host server via an interface, which may be a host SoC interface, such that the big cores module and the host server may be able to communicate to each other, for example, the big cores module may send the PnP prediction results to the host server via the host SoC interface.

A software agent running on the host server may collect the PnP metrics data and send to the big cores module. The software agent may collect the PnP metrics data at a predetermined collection time interval and receive the PnP prediction results from the big cores module at a predetermined receiving time interval. The software agent may generate hardware PnP control options and parameters for the hardware PnP control options based on the PnP prediction results, and apply the hardware PnP control options to hardware components such as a CPU, memory, graphic processing unit (GPU), input/output (I/O) interface, storage devices, network devices, peripherals, and the like, of the host server. The hardware PnP control options and parameters may include turning on/off certain components, adjusting CPU frequency, adjusting memory read/write rate, and the like. The software agent may revise a scheduler algorithm based on the PnP prediction results, and apply the revised scheduler algorithm to software components such as a virtual machine (VM), containers, processes, jobs, tasks, operating system (OS) scheduler, job scheduler, and the like, of the host server. For example, certain jobs, tasks, and processes may be delayed or re-ordered in an execution sequence.

The hybrid SoC device for predicting the PnP requirements described above may be used in a system to predict or monitor an increase in a workload of servers, and provide mechanisms or techniques to meet the increased workload. For example, the system may determine that the CPU utilization is higher than a threshold based on the monitored or predicted workloads, then the system may enable a turbo mode of one or more CPUs to temporarily increase the processing speed.

The system may comprise a plurality of servers that are coupled to each other and each server having one or more CPUs, and a workload monitoring module coupled to the plurality of servers. The workload monitoring module may monitor an increase in a workload among the plurality of servers, and determine a type of the increased workload. The increased workload may be an actual increase in the workload detected or a predicted increase in the workload. The workload monitoring module may determine, or measure, ambient temperature of an environment in which the plurality of servers is located, for example in a rack, and select a CPU of a particular server of the plurality of servers based on a turbo frequency of the CPU in a turbo mode available for the type of the increased workload at the ambient temperature, and enable the turbo mode of the selected CPU to meet the increased workload. The workload monitoring module may determine that the increased workload is greater than a predetermined threshold prior to selecting the CPU. The predetermined threshold may be specific to the determined type of the increase workload. The workload monitoring module may select the CPU from a characterization database based on a turbo frequency residency of the CPU that is available for a given type of the increased workload at a given ambient temperature. The turbo frequency residency may be defined as the percentage of time the CPU is able to run at a particular turbo frequency. For example, in a measurement window of 20 seconds, for a particular workload type at 25° C., CPU #1 may be able to run at 2.6 GHz for 77% of the time, at 2.7 GHz for 22% of the time, and at 2.8 GHz for 1% of the time.

The characterization database may be organized by a CPU identity (ID) with which each one of the CPUs in the plurality of servers may be identified, the workload type, and the ambient temperate. For each CPU, identifiable by the CPU ID, the characterization database may provide a turbo frequency of the CPU and a duration for which the CPU is able to maintain the turbo frequency (turbo frequency residency) for predefined workload types at predefined ambient temperatures, for example, 10° C., 25° C., and 40° C. To take possible aging and inaccuracies into account, the characterization database may be updated periodically, once every three months for example, by re-measuring the turbo frequency of the CPU and the duration for which the CPU is able to maintain the turbo frequency for the predefined workload types at the predefined ambient temperatures. The characterization database may be stored in an online database such that the workload monitoring module, which may or may not be co-located with the plurality of servers, may access the online database via online communication such as the Internet.

Once the workload monitoring module determines to enable the turbo mode of the selected CPU, or CPUs to meet the increased workload, the power supplied to the plurality of servers may need to be evaluated to determine whether a maximum power currently available is sufficient to meet the increased power consumption of the servers due to the CPUs operating in the turbo mode.

As described above, the workload monitoring module may monitor, and predict, a workload of each of a plurality of servers, which may be housed in a server rack. The workload monitoring module may determine an aggregated power required for the plurality of servers based on the predicted workloads, determine whether the aggregated power exceeds a maximum rack power at a maximum rack current available from a power distribution unit (PDU) that supplies power to the plurality of servers, and control operation of a battery pack, which may also be housed in the server rack, based on the aggregated power to meet the predicted workloads. The workload monitoring module may calculate the aggregated power for the plurality of servers based on expected increased power consumption of the one or more CPUs running in a turbo mode to meet the predicted respective workload. The workload monitoring module may determine a respective current required for each of the plurality of servers based on the predicted respective workload and a respective associated CPU frequency.

The workload monitoring module may control the operation of the battery pack to supplement power to the plurality of servers if the aggregated power exceeds the maximum rack power, and determine a discharge current required from the battery pack to supplement sufficient power in addition to the maximum rack power to meet the aggregated power. If the aggregated power does not exceed the maximum rack power, then workload monitoring module may cap a rack current from the PDU to the plurality of servers to a value less than the maximum rack current.

The workload monitoring module may additionally detect a power outage at the PDU, and upon detecting the power outage, may determine a respective current required for each of the plurality of servers based on the respective monitored or predicted workload, calculate a total discharge current from the battery pack based on the respective currents, and setting a discharge current from the battery pack to the total discharge current. The workload monitoring module may set a respective current cap for each of the plurality of servers based on the predicted respective workload and a respective associated CPU frequency.

The workload monitoring module may also monitor an output power of the PDU, determine whether the output power exceeds the maximum rack power, and control the battery pack operation based on the output power. The PDU may be capable of supplying power exceeding the maximum rack power, up to a predetermined excess power, to the plurality of servers for a predetermined period of time. If the output power of the PDU exceeds the maximum rack power, the workload monitoring module may operate the battery pack in a discharge mode to meet an excess power required over the maximum rack power. If the output power of the PDU does not exceed the maximum rack power, the workload monitoring module may cap the output power to a value less than the maximum rack power.

FIG. 1 illustrates an example block diagram of a hybrid system-on-chip (SoC) device 100 that may be used for predicting the performance and power (PnP) requirements of a host server 102.

The hybrid SoC device 100 may comprise a big cores module 104, a small cores module 106 coupled to the big core module 104, and an artificial intelligence (AI) algorithm accelerator 108 coupled to the big core module 104 and the small cores module 106.

The big core module 104 may include a plurality of general purpose central processing units (CPUs), of which five, 110, 112, 114, 116, and 118 are illustrated. Each general-purpose CPU, 110, 112, 114, 116, and 118, may comprise a core, illustrated as a reduced instruction set computer (RISC) V Rocket Core, a data cache (D-CACHE) for loading cache lines fetched from memory into a register as data, and an instruction cache (I-CACHE) for accessing instructions faster. Each general-purpose CPU, 110, 112, 114, 116, and 118, may be coupled to a Rocket Custom Core (RoCC) interface, 120, 122, 124, 126, and 128, respectively, to help attach accelerators, such as the AI algorithm accelerator 108 to each RISC-V Rocket Core and to communicate with the small cores module 106. Each general-purpose CPU, 110, 112, 114, 116, and 118, may also be coupled to an AXI, or NASTI, interconnect, 130, 132, 134, 136, and 138, respectively, to connected to an external Input/Output (I/O) interface, such as a host SoC interface 140. The host SoC interface 140 is illustrated as being a component of the host server 102, however, the host SoC interface 140 may be an independent module outside of the host server 102, and may communicate with multiple host servers. The big cores module 104 may receive and pre-process the PnP metrics data of instances, such virtual machines, containers, processes, jobs, tasks, and the like, of the host server 102, and allocate computing resources of the small cores module 106 and the AI algorithm accelerator 108 for calculating the PnP requirements.

The small cores module 106 may comprise a plurality of massively parallel processing (MPP) units, and may map each instance associated with host server in the PnP metrics data to a corresponding MPP unit based on the allocated computing resources by the big cores module 104 for a per-instance metric calculation. For example, a large double input matrix calculation may be handled by each small core performing an inversion calculation. The small cores module 106 may also perform rule-based prediction, generate rule-based prediction results, and send the rule-based prediction results to big cores module 104. The rule-based prediction may include determining a state change in a monitored parameter, determining whether a threshold is met in a monitored parameter and generating a prediction based on the determination.

The AI algorithm accelerator 108 may calculate PnP prediction results, such as workload and power predictions, based on the per-instance calculations from the small cores module 106, and send the PnP prediction results to the big cores module 104. As described above, the big cores module 104 may be coupled to the host server 102 via the host SoC interface 140, and may send the PnP prediction results to the host server 102 via the host SoC interface 140.

A software agent, running on the host server 102, may collect the PnP metrics data of the host server 102 to be ultimately used to calculate PnP prediction results, send the PnP metrics data to the big cores module 104 via the host SoC interface 140, and receive the PnP prediction results from the big cores module 104 via the host SoC interface 140. The software agent may collect the PnP metrics data of the host server 102 at a predetermined collection time interval, and receive the PnP prediction results from the big cores module 104 at a predetermined receiving time interval.

The software agent may generate hardware PnP control options and parameters for the hardware PnP control options based on the PnP prediction results, and apply the hardware PnP control options to hardware components, such as a CPU, memory, graphic processing unit (GPU), input/output (I/O) interface, storage devices, network devices, peripherals, and the like, of the host server 102. The hardware PnP control options and parameters may include turning on/off certain components, adjusting CPU frequency, adjusting memory read/write rate, and the like. The software agent may revise a scheduler algorithm based on the PnP prediction results, and apply the revised scheduler algorithm to software components, such as a virtual machine (VM), containers, processes, jobs, tasks, operating system (OS) scheduler, job scheduler, and the like, of the host server 102. For example, certain jobs, tasks, and processes may be delayed or re-ordered in an execution sequence.

Figure 2:
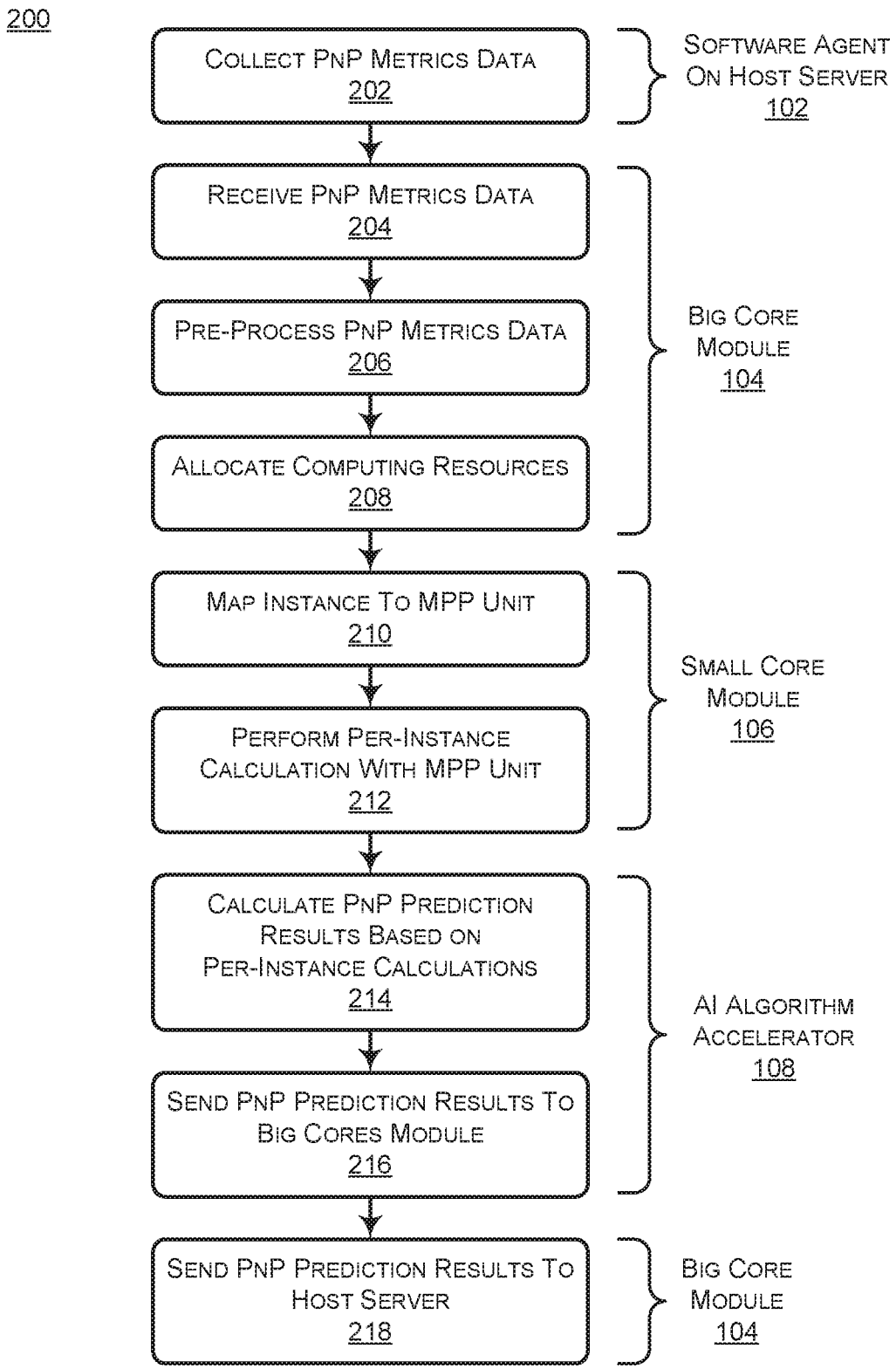
FIG. 2 illustrates an example flowchart describing a process of predicting the PnP requirements of the host server.

FIG. 2 illustrates an example flowchart 200 describing a process of predicting the performance and power (PnP) requirements of the host server 102.

At block 202, the software agent running on the host server 102 may collect the PnP metrics data to be sent to the big cores module 104. The software agent may collect the PnP metrics data at a predetermined collection frequency.

At block 204, the big cores module 104 may receiving the PnP metrics data of the host server 102, and pre-process the PnP metrics data at block 206 as discussed above with reference to FIG. 1. The big cores module 104 may then allocate computing resources of the small cores module 106 and the AI algorithm accelerator 108 for calculating the PnP requirements at block 208.

At block 210, the small cores module 106 may map each instance associated with host server in the PnP metrics data to a corresponding massively parallel processing (MPP) unit based on the allocated computing resources, and at block 212, the small core module 106 may perform a per-instance metric calculation with a mapped MPP unit. For example, a large double input matrix calculation may be handled by each small core performing an inversion calculation. Additionally, at block 212, the small cores module 106 may perform rule-based prediction to generate rule-based prediction results, and send the rule-based prediction results to the big cores module 104.

At block 214, AI algorithm accelerator 108 may calculate PnP prediction results based on the per-instance calculations from the small cores module 106, and may send the PnP prediction results to the big cores module 104 at block 216. The big cores module 104 may then send the PnP prediction results to the host server 102 via a host SoC interface 140 at block 218.

Figure 3:
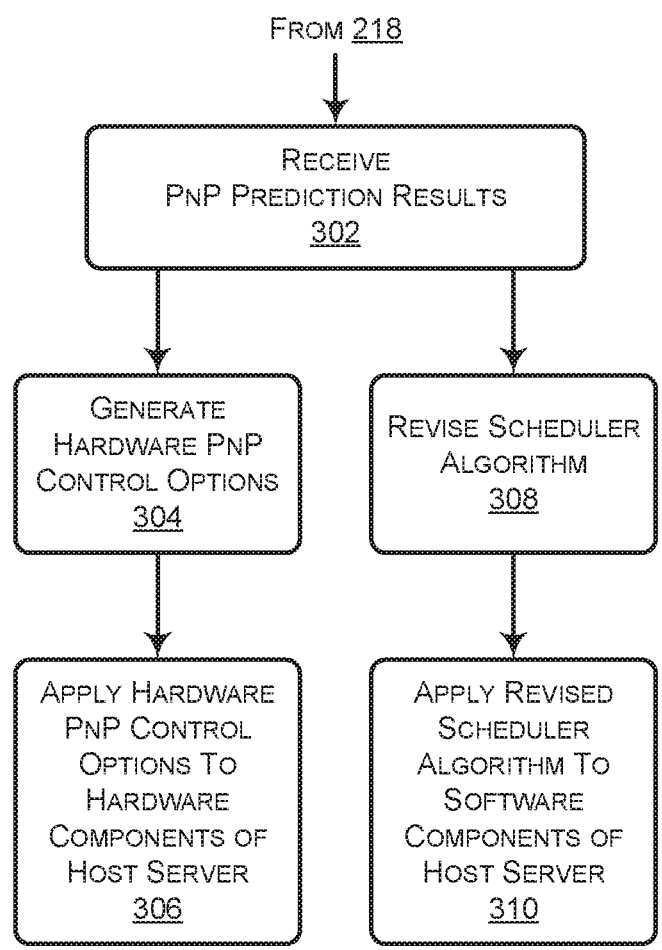
FIG. 3 illustrates an example flowchart for using the PnP prediction results in the host server.

FIG. 3 illustrates an example flowchart 300 for using the PnP prediction results in the host server 102.

At block 302, the software agent may receive the PnP prediction results from the big cores module 104. The software agent may receive the PnP prediction results at a predetermined receiving frequency.

At block 304, the software agent may generate hardware PnP control options and parameters for the hardware PnP control options based on the PnP prediction results, and may applying the hardware PnP control options to hardware components, such as a CPU, memory, GPU, I/O interface, storage devices, network devices, peripherals, and the like, of the host server 102 at block 306. The hardware PnP control options and parameters may include turning on/off certain components, adjusting CPU frequency, adjusting memory read/write rate, and the like.

Alternatively, or additionally, the software agent may revise a scheduler algorithm based on the PnP prediction results at block 308, and may apply the revised scheduler algorithm to software components, such as a VM, containers, processes, jobs, tasks, OS scheduler, job scheduler, and the like, of the host server 102 at block 310. For example, certain jobs, tasks, and processes may be delayed or re-ordered in an execution sequence.

Figure 4:
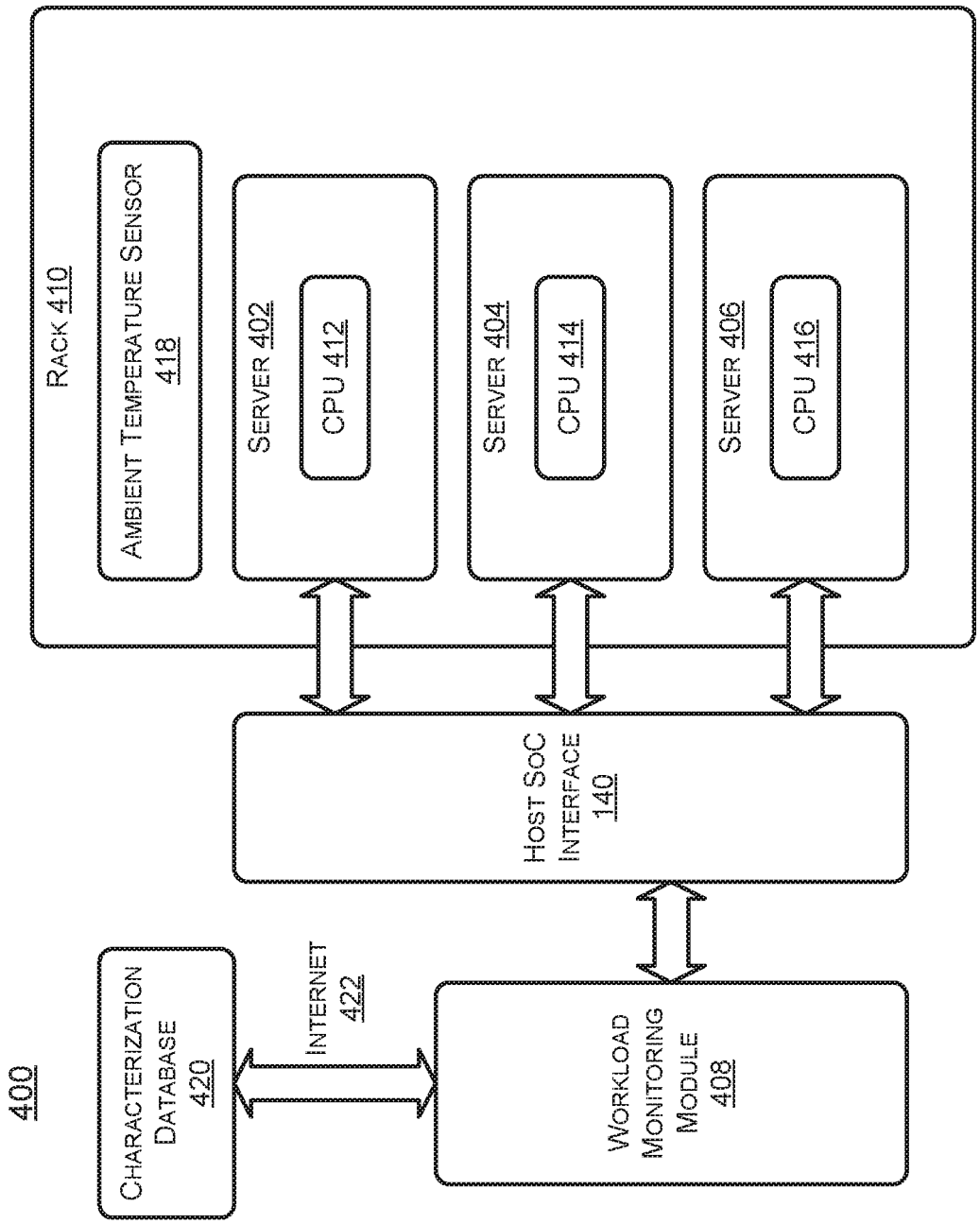
FIG. 4 illustrates an example block diagram for a system including the hybrid SoC device to predict or monitor an increase in a workload of servers, and provide mechanisms or techniques to meet the increased workload.

FIG. 4 illustrates an example block diagram for a system 400 including the hybrid SoC device 100 described above to predict or monitor an increase in a workload of servers, and provide mechanisms or techniques to meet the increased workload. For example, the system 400 may determine that the CPU utilization is higher than a threshold based on the monitored or predicted workloads, then the system may enable a turbo mode of one or more CPUs to temporarily increase the processing speed.

The system 400 may comprise a plurality of servers, of which three, 402, 404, and 406 are illustrated, and a workload monitoring module 408, which may include the hybrid SoC 100 described above with reference to FIG. 1, coupled to the plurality of servers 402, 404, and 406 via the host SoC interface 140. A rack 410 may house the plurality of servers, 402, 404, and 406, each of which may include one or more CPUs (one CPU, 412, 414, and 416, respectively, for each server are illustrated), and an ambient temperature sensor 418 for measuring the ambient temperature of the environment in which the plurality of the servers, 402, 404, and 406, reside in the rack 410.

As discussed above with reference to the hybrid SoC 100 in FIG. 1, the workload monitoring module 408 may monitor an increase in a workload among the plurality of servers 402, 404, and 406, and determine a type of the increased workload and ambient temperature of an environment in which the servers 102, 404, and 406 are located, i.e., in the rack 410, using the ambient temperature sensor 418. In response to the workload increase, the workload monitoring module 408 may determine that the increased workload is greater than a predetermined threshold, then may select a CPU of a particular server of the plurality of servers based on a turbo frequency of the CPU in a turbo mode available for the type of the increased workload at the ambient temperature. The predetermined threshold may be a threshold specific to the type of the increase workload determined. Based on the type of the increased workload, for example type A, at the measured ambient temperature, the workload monitoring module 408 may determine that a CPU now needs to run at 2.7 GHz. If the turbo frequency available at the ambient temperature is 2.6 GHz for the CPU 412, 2.7 GHz for the CPU 414, and 2.8 GHz for the CPU 416, the workload monitoring module 408 may select the CPU 414 of the server 404, and enable the turbo mode of the CPU 414 to meet the increased workload. The workload monitoring module 408 may additionally select the CPU based on a time duration the turbo frequency of the CPU available for the type of the increased workload at the ambient temperature. For example, if the workload monitoring module 408 determines that a CPU needs to run at 2.7 GHz for 5 seconds to meet the increased workload, but the CPU 414 is capable of the turbo frequency of 2.7 GHz for 3 seconds and the CPU 416 is capable of the turbo frequency of 2.8 GHz for 5 seconds, the workload monitoring module 408 may select the CPU 416 to run at 2.8 GHz.

The workload monitoring module 408 may select a CPU from a characterization database 420 based on the characteristics of the CPU desired to meet the increased workload. The characterization database 420 may be stored in an online database remotely accessible by the workload monitoring module 408, for example, by the Internet 422.

FIGS. 5A and 5B illustrates example characterization database 420 listing characteristics of the CPUs in the servers.

The characterization database 420 may be organized and indexed, for a sample window 502 and a workload type 504 at a given input power 506, by ambient temperature 508, a CPU identification (ID) 510, a turbo frequency 512, a duration of the turbo frequency available 514, i.e., the duration for which the CPU is able to maintain the turbo frequency, a turbo frequency residency 516 calculated as a ratio of the duration of the turbo frequency available to the sample window size. FIG. 5A illustrated an example characterization database 420 for the sample window 502 of 20 seconds, the workload type of A, the input power 506 of 105 Watts, and the ambient temperature 508 of 20° C., 30° C., and T_max. FIG. 5B illustrated an example characterization database 420 for the same sample window 502 and the workload type of A with the input power 506 of 120 watts instead of 105 watts in FIG. 5A, and the ambient temperature 508 of 20° C., 30° C., and T_max. The characterization database 420 may additionally include characterization data, the turbo frequency 512, the duration of the turbo frequency available 514, and the turbo frequency residency 516, of the CPUs identified in the CPU ID 510 for various sample windows 502 and workload types 504 for different input powers 506 and ambient temperatures 508.

To take possible aging and inaccuracies into account, for each sample window and the workload type for the given input power, the characterization database 420 may be updated periodically, once every three months for example, by re-measuring the turbo frequency of each CPUs and the duration of the turbo frequency, and re-calculating the turbo frequency residency.

Figure 6:
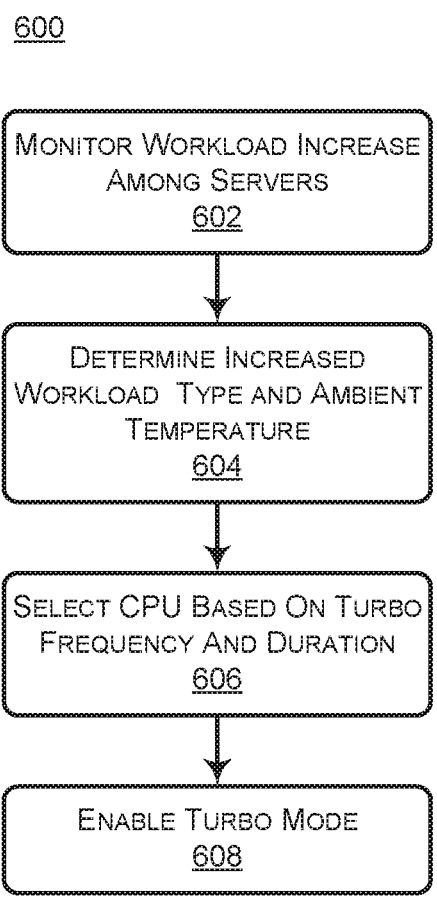
FIG. 6 illustrates an example flowchart for the workload monitoring module for predicting or monitoring an increase in a workload of servers, and provide mechanisms to meet the increased workload.

FIG. 6 illustrates an example flowchart 600 for the workload monitoring module 408 for predicting or monitoring an increase in a workload of servers, and provide mechanisms or techniques to meet the increased workload.

At block 602, the workload monitoring module 408 may monitor an increase in a workload among the plurality of servers, such as the servers 402, 404, and 406, and at block 604, determine a type of the increased workload and ambient temperature of an environment in which the servers 102, 404, and 406 are located, i.e., in the rack 410, using the ambient temperature sensor 418. At block 606, the workload monitoring module 408 may select a CPU of a particular server of the plurality of servers based on a turbo frequency of the CPU available in a turbo mode for the type of the increased workload at the ambient temperature, as described above with reference to FIG. 4. The workload monitoring module 408 may then enable the turbo mode of the selected CPU in block 608.

Figure 7:
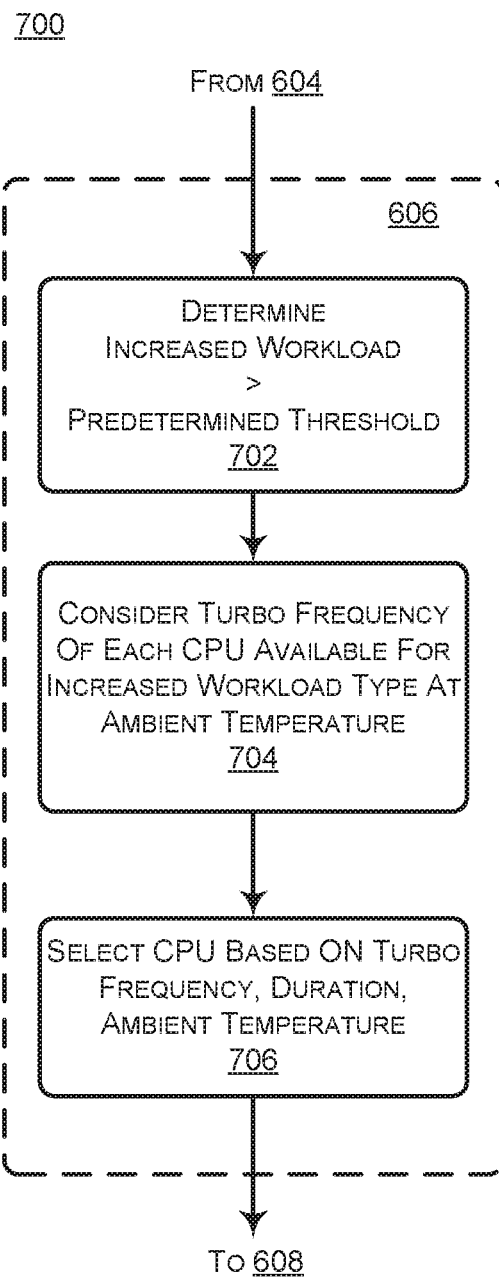
FIG. 7 illustrates an example flowchart detailing the process of selecting the CPU as described in one of blocks in FIG. 6.

FIG. 7 illustrates an example flowchart 700 detailing the process of selecting the CPU of block 606.

The workload monitoring module 408 may determine that the increased workload is greater than a predetermined threshold prior to selecting the CPU at block 702. The threshold may be specific to the determined type of the increase workload in block 604. At block 704, the workload monitoring module 408 may also consider a time duration of the turbo frequency of each CPU available for the type of the increased workload at the ambient temperature. The workload monitoring module 408 may then select a CPU based on the turbo frequency of the CPU available in the turbo mode, the duration of the turbo frequency available for the type of the increased workload at the ambient temperature at block 706. The workload monitoring module 408 may select the CPU from the characterization database 420, as described above with reference to FIGS. 5A and 5B, which may be stored in an online database accessible remotely by the workload monitoring module 408.

As described above, the workload monitoring module 408 may monitor, and predict, a workload of each of the plurality of servers 402, 404, and 406, which may be housed in the server rack 410. The workload monitoring module 408 may further control the power required for the servers 402, 404, and 408 to operate to meet the change in the monitored or predicted workload.

Figure 8:
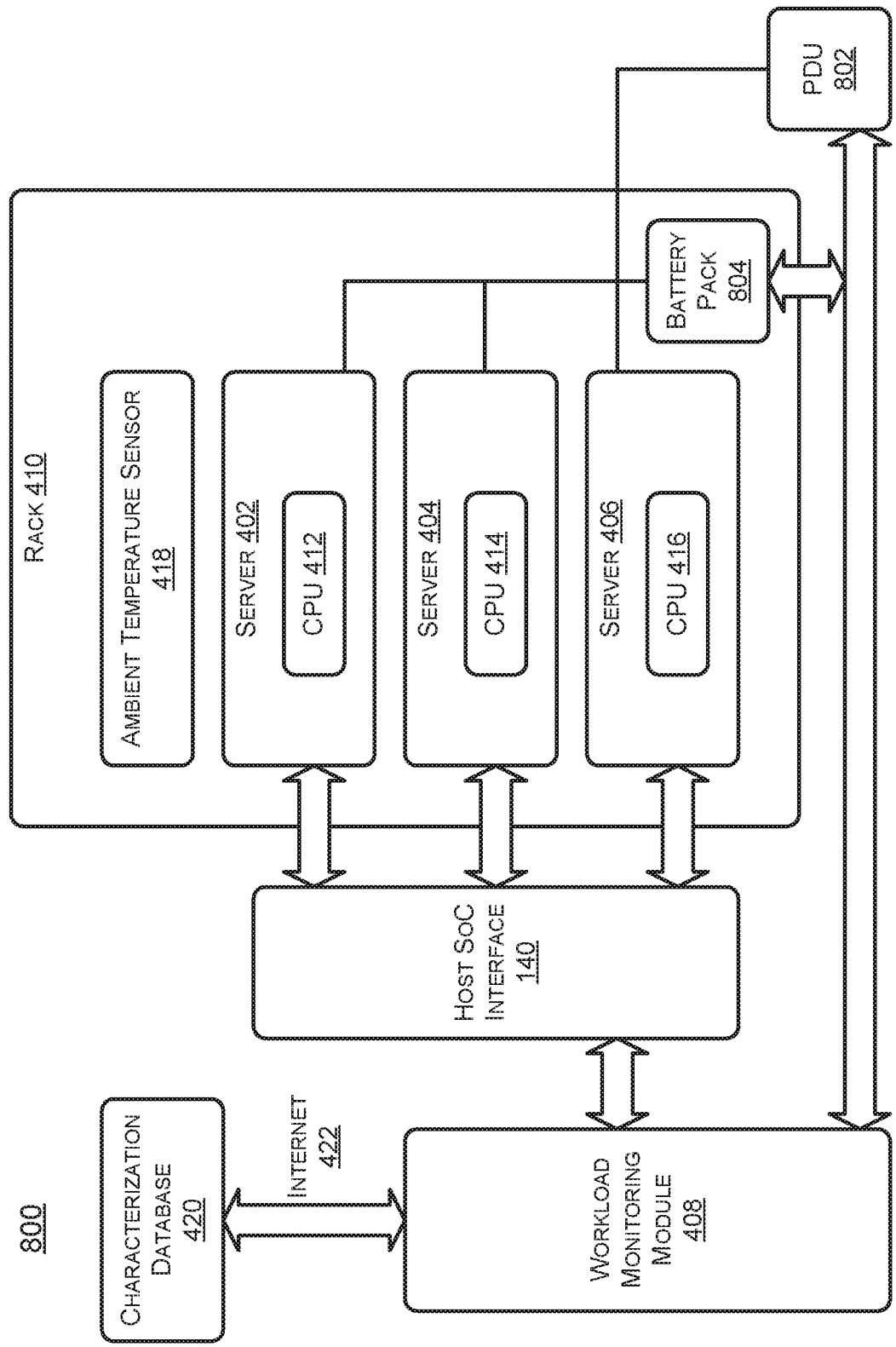
FIG. 8 illustrates an example block diagram of a system for controlling supplied power to the servers to meet the predicted or monitored change in the workload of the servers.

FIG. 8 illustrates an example block diagram of a system 800 for controlling supplied power to the plurality of servers 402, 404, and 406 to meet predicted or monitored change in the workload of the servers, 402, 404, and 406.

The system 800 may include all the components described in FIG. 4, and additionally include a power distribution unit (PDU) 802 and a battery pack 804. The PDU 802 may be coupled to the plurality of servers 402, 404, and 406, and may be capable of supplying power to the plurality of servers 402, 404, and 406 for up to a maximum rack power at a maximum rack current. The battery pack 804 may be coupled to the plurality of servers and 402, 404, and 406, and the PDU 802, and may be housed in the server rack 410. The battery pack 804 may be capable of powering the plurality of servers 402, 404, and 406 for a certain period of time without the PDU 802. The battery pack 804 may be charged at a normal charge rate to maintain a certain charge level such that, when needed, the battery pack 804 may be able to power the plurality of servers 402, 404, and 406.

The workload monitoring module 408 may be coupled to the servers 402, 404, and 406, the PDU 802, and the battery pack 804. The workload monitoring module 408 may monitor and predict a workload of each of the servers 402, 404, and 406, and determine an aggregated power required for the servers based on the predicted workloads. The workload monitoring module 408 may determine whether the aggregated power exceeds the maximum rack power, and may control a battery pack operation of the battery pack 804 based on the aggregated power.

The workload monitoring module 408 may control the operation of the battery pack 804 to supplement power to the plurality of servers 402, 404, and 406, upon determining that the aggregated power exceeds the maximum rack power. For example, based on the predicted workload increase, the workload monitoring module 408 may determine to enable the turbo mode of one or more of the CPUs 412, 414, and 416, and may determine that the aggregated power, required to run the one or more of the CPUs 412, 414, and 416 CPUs in the turbo mode to meet the predicted workload increase, exceeds the maximum rack power available from the PDU 802. The difference between the aggregated power and the rack power may be supplemented by the battery pack 804. The workload monitoring module 408 may also determine a discharge current required from the battery pack 804 to supplement sufficient power in addition to the maximum rack power from the PDU 802 to meet the aggregated power, and may set the discharge current from the battery pack 804 to the required discharge current.

The workload monitoring module 408 may also determine a current required for each of the plurality of servers 402, 404, and 406 based on the predicted workload and an associated CPU frequency for each server, and may determine that the aggregated power does not exceed the maximum rack power. For example, the predicted workload may be lower than a normally expected level, and may allow one or more of the CPUs 412, 414, and 416 to run slower than their normal speed, thereby reducing the required power to the plurality of servers, 402, 404, and 406. The workload monitoring module 408 may then cap a rack current from the PDU 802 to the plurality of servers 402, 404, and 406 to a value less than the maximum rack current.

The workload monitoring module 408 may detect a power outage at the PDU 802, determine a respective current required for each of the plurality of servers 402, 404, and 406, based on the respective predicted workload, and calculate a total discharge current from the battery pack 804 based on the respective currents. Instead of running the CPUs at the speed prior to the power outage or at the speed available with the maximum current available from the battery pack 804, the workload monitoring module 408 may set a maximum discharge current from the battery pack 804 to the total discharge current predicted, which may be lower than the maximum discharge current available from the battery pack 804. By setting the discharge current lower may allow the battery pack 804 to last longer during the power outage. The workload monitoring module 408 may is set a current cap for each of the plurality of servers 402, 404, and 406, based on the predicted workload and an associated CPU frequency of each CPU 412, 414, and 416.

The workload monitoring module 408 may monitor the cost of electricity being supplied, and may determine to charge the battery pack 804 at a high rate when the cost of electricity is lower than a low threshold, and charge the battery pack 804 at a low rate when the cost of electricity is higher than a high threshold. The workload monitoring module 408 may also determine to charge the battery pack 804 at a high rate, i.e., higher than the normal charge rate, if the current workload is low but the workload is predicted to increase to meet the predicted workload increase.

The PDU 802 may be capable of supplying power exceeding the maximum rack power, up to a predetermined excess power, to the plurality of servers 402, 40, and 406, for a predetermined period of time, 100 watts over the maximum rack power for 10 seconds for example. The workload monitoring module 408 may monitor the output power of the PDU 802, determine whether the output power exceeds the maximum rack power, and control the operation of the battery pack 80 based on the output power. For example, upon determining that the output power exceeds the maximum rack power, the workload monitoring module 408 may operate the battery pack 804 in a discharge mode to meet the excess power required over the maximum rack power. Upon determining that the output power does not exceed the maximum rack power, the workload monitoring module 408 may cap the output power of the PDU 802 to a value less than the maximum rack power.

Figure 9:
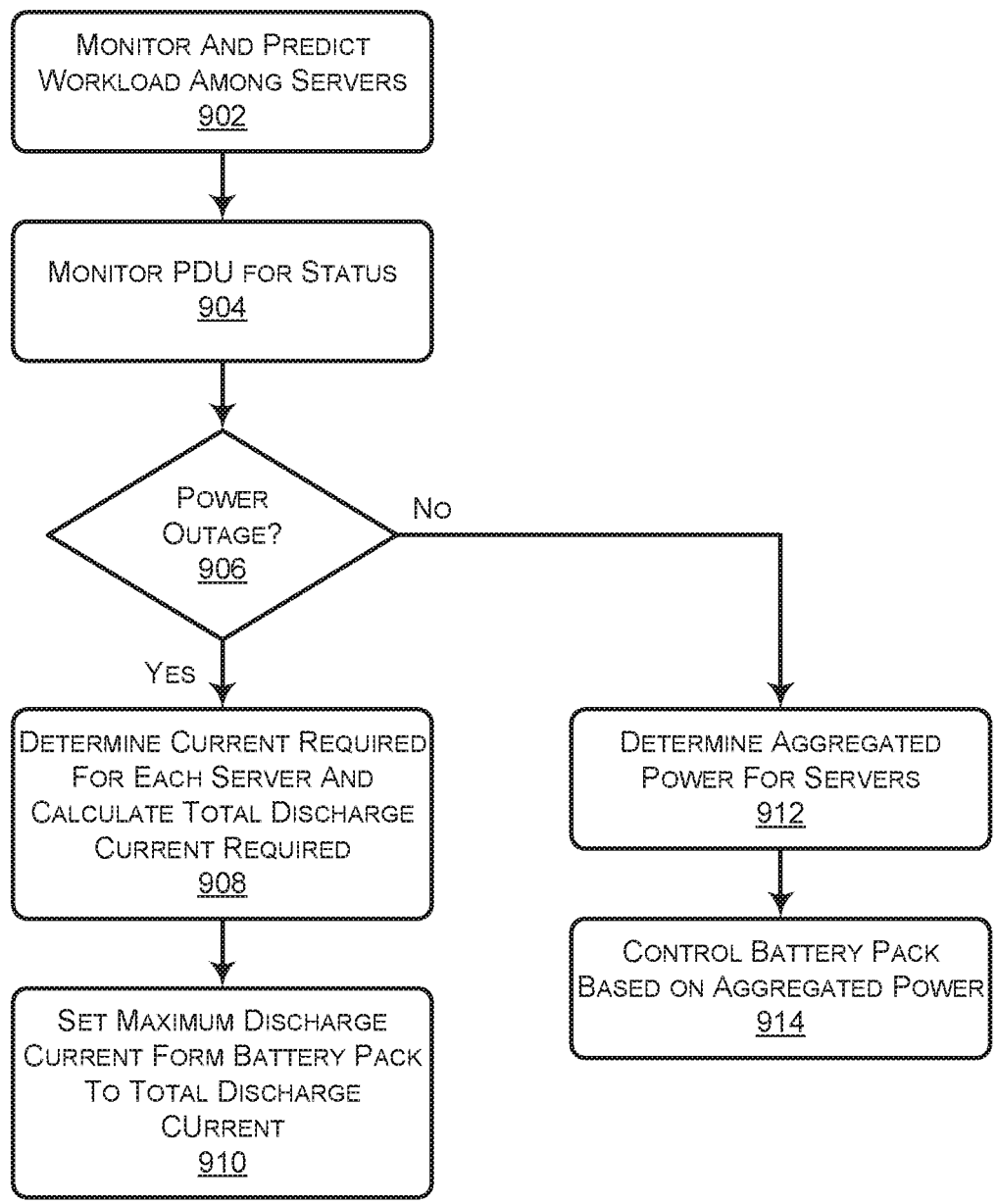
FIG. 9 illustrates an example flowchart for controlling supplied power to the servers to meet the predicted or monitored change in the workload of the servers.

FIG. 9 illustrates an example flowchart 900 for controlling supplied power to the plurality of servers 402, 404, and 406 to meet the predicted or monitored change in the workload of the servers 402, 404, and 406.

At block 902, the workload monitoring module 408 may monitor and predict a workload of each of the plurality of servers, 402, 404, and 406, housed in the server rack 410. As discussed above with reference to FIGS. 4 and 8, each of the plurality of servers 402, 404, and 406, may include one or more central processing units (CPUs), 412, 414, and 416, respectively. At block 904, the workload monitoring module 408 may monitor the status of the PDU 802, such as the maximum rack power, the maximum rack current, an instant power and current being supplied, and the like. If the workload monitoring module 408 detects a power outage in the PDU 802 at block 906, the workload monitoring module 408 may determine a current required for each of the plurality of servers 402, 404, and 406, based on the predicted workload for each server, and calculate a total discharge current required based on each current at block 908. At 910, the workload monitoring module 408 may set a maximum discharge current from the battery pack 804 to the total discharge current. The workload monitoring module 408 also set a current cap for each of the plurality of servers, 402, 404, and 406, based on the predicted workload for each server and an associated CPU frequency of each server.

If the workload monitoring module 408 does not detect a power outage in the PDU 802 at block 906, the workload monitoring module 408 may determine an aggregated power required for the plurality of servers, 402, 404, and 406, based on the monitored or predicted workloads at block 912. For example, the workload monitoring module 408 may calculate the aggregated power for the plurality of servers 402, 404, and 406, based on expected increased power consumption of the one or more CPUs, 412, 414, and 416, of the plurality of servers 402, 404, and 406, running in a turbo mode to meet the predicted respective workload. The workload monitoring module 408 may also calculate the aggregated power for the plurality of servers 402, 404, and 406, based on monitored, or actual, power consumption of the plurality of servers 402, 404, and 406. The workload monitoring module 408 may also determine a current required for each of the plurality of servers, 402, 404, and 406, based on the predicted workload and an associated CPU frequency of each CPU. Based on the aggregated power, the workload monitoring module 408 may control the operation of the battery pack 804, at block 914, to meet the predicted workloads of the servers 402, 404, and 406.

Figure 10:
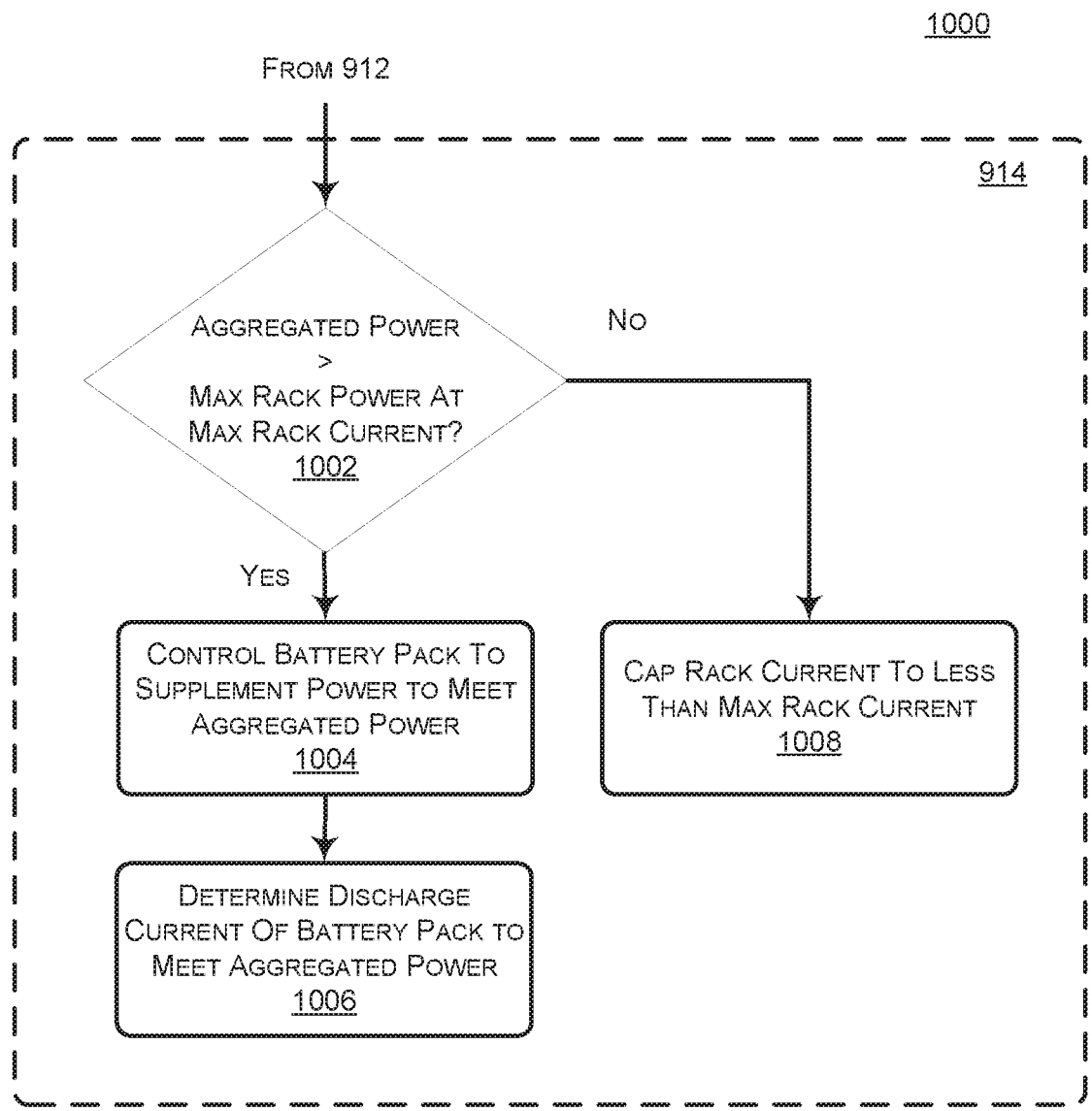
FIG. 10 illustrates an example flowchart detailing the process of controlling the battery pack as described in one of blocks in FIG. 9.

FIG. 10 illustrates an example flowchart 1000 detailing the process of controlling the battery pack 804 as described in block 914 in FIG. 9.

At 1002, the workload monitoring module 408 may determine whether the aggregated power exceeds the maximum rack power at the maximum rack current available from the PDU 802, which supplies power to the plurality of servers, 402, 404, and 406. If the workload monitoring module 408 determines that the aggregated power exceeded the maximum rack power, the workload monitoring module 408 may control the battery pack 804 to supplement power to the plurality of servers, 402, 404, and 406 to meet the aggregated power in block 1004. For example, based on the predicted workload, which may an increase, the workload monitoring module 408 may determine to enable the turbo mode of on or more of the CPUs 412, 414, and 416, and determine that the aggregated power, required to run the one or more of the CPUs 412, 414, and 416 CPUs in the turbo mode to meet the predicted workload increase, exceeds the maximum rack power available from the PDU 802.

The workload monitoring module 408 may further determine a discharge current required from the battery pack 804 to supplement sufficient power in addition to the maximum rack power of the PDU 802 to meet the aggregated power at block 1006, and apply set the discharge current from the battery pack 804 to the required discharge current.

If the workload monitoring module 408 determines that the aggregated power did not exceed the maximum rack power at block 1002, then the workload monitoring module 408 may cap a rack current from the PDU 802 to the plurality of servers 402, 404, and 406 to a value less than the maximum rack current at block 1008.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2, 3, 6, 7, 9 and 10. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A device for predicting performance and power (PnP) requirements of a host server, the device comprising: a big cores module including a plurality of general purpose central processing units (CPUs), the big cores module configured to receive and pre-process PnP metrics data of the host server and to allocate computing resources for calculating the PnP requirements; a small cores module including a plurality of massively parallel processing (MPP) units, the small cores module coupled to the big cores module, the small cores module configured to map each instance associated with host server in the PnP metrics data to a corresponding MPP unit based on the allocated computing resources for a per-instance metric calculation; and an artificial intelligence (AI) accelerator coupled to the big cores module and the small cores modules, the AI accelerator configured to calculate PnP prediction results based on the per-instance calculations from the small cores module and to send the PnP prediction results to the big cores module.

B. The device as paragraph A recites, wherein the small cores module is further configured to perform rule-based prediction, generate rule-based prediction results, and send the rule-based prediction results to big cores module.

C. The device as paragraph A recites, wherein the big cores module is coupled to the host server via a host interface, the big cores module further configured to send the PnP prediction results to the host server via the host interface.

D. The device as paragraph C recites, wherein a software agent running on the host server is configured to collect the PnP metrics data to be sent to the big cores module and receive the PnP prediction results from the big cores module.

E. The device as paragraph D recites, wherein the software agent is further configured to collect the PnP metrics data at a predetermined collection frequency and receive the PnP prediction results from the big cores module via the host interface at a predetermined receiving frequency.

F. The device as paragraph D recites, wherein the software agent is further configured to generate hardware PnP control options and parameters for the hardware PnP control options based on the PnP prediction results.

G. The device as paragraph F recites, wherein the software agent is further configured to apply the hardware PnP control options to hardware components of the host server.

H. The device as paragraph D recites, wherein the software agent is further configured to revise a scheduler algorithm based on the PnP prediction results.

I. The device as paragraph H recites, wherein the software agent is further configured to apply the revised scheduler algorithm to software components of the host server.

J. The device as paragraph A recites, wherein the device a hybrid system on chip (SoC).

K. A method for predicting performance and power (PnP) requirements of a host server, the method comprising: receiving and pre-processing, by a big cores module of a device, PnP metrics data of the host server, the big cores module including a plurality of general purpose central processing units (CPUs); allocating, by the big cores module, computing resources for calculating the PnP requirements; mapping, by a small cores module of the device, each instance associated with host server in the PnP metrics data to a corresponding massively parallel processing (MPP) unit based on the allocated computing resources for a per-instance metric calculation, the small cores module including a plurality of MPP units; calculating, by an artificial intelligence (AI) accelerator of the device, PnP prediction results based on the per-instance calculations from the small cores module; and sending, by the AI accelerator, the PnP prediction results to the big cores module.

L. The method as paragraph K recites, further comprising: performing, by the small cores module, rule-based prediction to generate rule-based prediction results, and sending, by the small cores module, the rule-based prediction results to the big cores module.

M. The method as paragraph K recites, further comprising: sending, by the big cores module, the PnP prediction results to the host server via a host interface.

N. The method as paragraph M recites, further comprising: collecting, by a software agent running on the host server, the PnP metrics data to be sent to the big cores module; and receiving, by the software agent, the PnP prediction results from the big cores module via the host interface.

O. The method as paragraph N recites, wherein: collecting, by a software agent running on the host server, the PnP metrics data to be sent to the big cores module includes collecting the PnP metrics data at a predetermined collection frequency; and receiving, by the software agent, the PnP prediction results from the big cores module includes receiving the PnP prediction results from the big cores module at a predetermined receiving frequency.

P. The method as paragraph N recites, further comprising: generating, by the software agent, hardware PnP control options and parameters for the hardware PnP control options based on the PnP prediction results.

Q. The method as paragraph P recites, further comprising: applying, by the software agent, the hardware PnP control options to hardware components of the host server.

R. The method as paragraph N recites, further comprising: revising, by the software agent, a scheduler algorithm based on the PnP prediction results.

S. The method as paragraph R recites, further comprising: applying, by the software agent, the revised scheduler algorithm to software components of the host server.

T. The method as paragraph K recites, wherein the device is a hybrid system on chip (SoC).

U. A non-transitory computer-readable storage medium storing computer-readable instructions executable by one or more processors, that when executed by the one or more processors, cause the one or more processors to perform operations comprising: collecting performance and power (PnP) metrics data of a host server; transmitting the PnP metrics data, via a host interface, to a big cores module of a device, the big cores module including a plurality of general purpose central processing units (CPUs); pre-processing, by the big cores module, the PnP metrics data; allocating, by the big cores module, computing resources for calculating the PnP requirements; mapping, by a small cores module of the device, each instance associated with host server in the PnP metrics data to a corresponding massively parallel processing (MPP) unit based on the allocated computing resources for a per-instance metric calculation, the small cores module including a plurality of MPP units; calculating, by an artificial intelligence (AI) accelerator of the device, PnP prediction results based on the per-instance calculations from the small cores module; sending, by the AI accelerator, the PnP prediction results to the big cores module; receiving, by the big cores module, the PnP prediction results from the AI accelerator; sending, by the big cores module, the PnP prediction to the host server via the host interface; and receiving the PnP prediction results from the big cores module.

V. The non-transitory computer-readable storage medium as paragraph U recites, wherein the operations further comprise: generating hardware PnP control options and parameters for the hardware PnP control options based on the PnP prediction results.

W. The non-transitory computer-readable storage medium as paragraph V recites, wherein the operations further comprise: applying the hardware PnP control options to hardware components of the host server.

X. The non-transitory computer-readable storage medium as paragraph U recites, wherein the operations further comprise: revising a scheduler algorithm based on the PnP prediction results; and applying the revised scheduler algorithm to software components of the host server.

Y. The non-transitory computer-readable storage medium as paragraph U recites, wherein the operations further comprise: performing, by the small cores module, rule-based prediction to generate rule-based prediction results, and sending, by the small cores module, the rule-based prediction results to the big cores module.

Z. The non-transitory computer-readable storage medium as paragraph U recites, wherein the device is a hybrid system-on-chip (SoC).

AA. A system comprising: a plurality of servers, each of the plurality of servers including one or more central processing units (CPUs); and a workload monitoring module coupled to the plurality of servers, the workload monitoring module configured to: monitor an increase in a workload among the plurality of servers, determine a type of the increased workload and ambient temperature of an environment in which the plurality of servers is located, select a CPU of a particular server of the plurality of servers based on a turbo frequency of the CPU in a turbo mode available for the type of the increased workload at the ambient temperature, and enable the turbo mode of the selected CPU.

AB. The system as paragraph AA recites, wherein the workload monitoring module is further configured to select the CPU based on a time duration the turbo frequency of the CPU is available for the type of the increased workload at the ambient temperature.

AC. The system as paragraph AB recites, wherein the workload monitoring module is further configured to select the CPU from a characterization database, the characterization database comprising: a plurality of CPU identities (IDs) corresponding to a plurality of CPUs of the plurality of servers; for each CPU ID: at each ambient temperature of a preselected set of ambient temperatures for each workload type of a preselected set of workload types, a respective turbo frequency of a CPU corresponding to the CPU ID; and a respective duration for which the corresponding CPU is able to maintain the respective turbo frequency.

AD. The system as paragraph AC recites, wherein the characterization database is updated at a predetermined time interval, the update includes, at the predetermined time interval: at each ambient temperature of the preselected set of ambient temperatures for each workload type of the preselected set of workload types, measuring the respective turbo frequency of the CPU corresponding to the CPU ID, and measuring the respective duration for which the corresponding CPU is able to maintain the respective turbo frequency; and updating the characterization database based on the measured turbo frequencies and the measured time durations for the respective CPUs under the corresponding CPU IDs.

AE. The system as paragraph AD recites, wherein the characterization database is stored in an online database, the online database accessible by the workload monitoring module. AF. The system as paragraph AA recites, wherein the workload monitoring module is further configured to determine that the increased workload is greater than a predetermined threshold prior to selecting the CPU.

AG. The system as paragraph AF recites, wherein the workload monitoring module is further configured to determine that the increased workload is greater than a predetermined threshold specific to the determined type of the increase workload.

AH. A method in a workload monitoring module coupled to a plurality of servers, each of the plurality of servers including one or more central processing units (CPUs), the method comprising: monitoring an increase in a workload among the plurality of servers; determining a type of the increased workload and ambient temperature of an environment in which the plurality of servers is located; selecting a CPU of a particular server of the plurality of servers based on a turbo frequency of the CPU available in a turbo mode for the type of the increased workload at the ambient temperature; and enabling the turbo mode of the selected CPU.

AI. The method as paragraph AH recites, wherein selecting the CPU based on the turbo frequency of the CPU available in the turbo mode for the type of the increased workload at the ambient temperature includes selecting the CPU based on a time duration the turbo frequency of the CPU is available for the type of the increased workload at the ambient temperature.

AJ. The method as paragraph AI recites, wherein selecting the CPU includes selecting the CPU from a characterization database, and wherein the characterization database comprises: a plurality of CPU identities (IDs) corresponding to a plurality of CPUs of the plurality of servers; for each CPU ID: at each ambient temperature of a preselected set of ambient temperatures for each workload type of a preselected set of workload types, a respective turbo frequency of a CPU corresponding to the CPU ID; and a respective duration for which the corresponding CPU is able to maintain the respective turbo frequency.

AK. The method as paragraph AJ recites, further comprising: at a predetermined time interval, at each ambient temperature of the preselected set of ambient temperatures for each workload type of the preselected set of workload types, measuring the respective turbo frequency of the CPU corresponding to the CPU ID, and measuring the respective duration for which the corresponding CPU is able to maintain the respective turbo frequency; and updating the characterization database based on the measured turbo frequencies and the measured time durations for the respective CPUs under the corresponding CPU IDs.

AL. The method as paragraph AK recites, further comprising: storing the characterization database in an online database, the online database accessible by the workload monitoring module.

AM. The method as paragraph AH recites, further comprising: determining that the increased workload is greater than a predetermined threshold prior to selecting the CPU.

AN. The method as paragraph AM recites, wherein determining that the increased workload is greater than the predetermined threshold includes: determining that the increased workload is greater than a predetermined threshold specific to the determined type of the increase workload.

AO. A non-transitory computer-readable storage medium storing computer-readable instructions executable by one or more computing devices, that when executed by the one or more computing devices, cause the one or more computing devices to perform operations comprising: monitoring an increase in a workload among a plurality of servers, each of the plurality of servers including one or more central processing units (CPUs); determining a type of the increased workload and ambient temperature of an environment in which the plurality of servers is located; selecting a CPU of a particular server of the plurality of servers based on a turbo frequency of the CPU available in a turbo mode for the type of the increased workload at the ambient temperature; and enabling the turbo mode of the selected CPU.

AP. The non-transitory computer-readable storage medium as paragraph AO recites, wherein selecting the CPU based on the turbo frequency of the CPU available in the turbo mode for the type of the increased workload at the ambient temperature includes selecting the CPU based on a time duration the turbo frequency of the CPU is available for the type of the increased workload at the ambient temperature.

AQ. The non-transitory computer-readable storage medium as paragraph AP recites, wherein selecting the CPU includes selecting the CPU from a characterization database, wherein the characterization database comprises: a plurality of CPU identities (IDs) corresponding to a plurality of CPUs of the plurality of servers; for each CPU ID: at each ambient temperature of a preselected set of ambient temperatures for each workload type of a preselected set of workload types, a respective turbo frequency of a CPU corresponding to the CPU ID; and a respective duration for which the corresponding CPU is able to maintain the respective turbo frequency.

AR. The non-transitory computer-readable storage medium as paragraph AQ recites, wherein the operations further comprise: at a predetermined time interval, at each ambient temperature of the preselected set of ambient temperatures for each workload type of the preselected set of workload types, measuring the respective turbo frequency of the CPU corresponding to the CPU ID, and measuring the respective duration for which the corresponding CPU is able to maintain the respective turbo frequency; and updating the characterization database based on the measured turbo frequencies and the measured time durations for the respective CPUs under the corresponding CPU IDs.

AS. The non-transitory computer-readable storage medium as paragraph AR recites, wherein the operations further comprise: storing the characterization database in an online database, the online database accessible by the one or more computing devices.

AT. The non-transitory computer-readable storage medium as paragraph AO recites, wherein the operations further comprise: determining that the increased workload is greater than a predetermined threshold prior to selecting the CPU.

AU. The non-transitory computer-readable storage medium as paragraph AT recites, wherein determining that the increased workload is greater than the predetermined threshold includes: determining that the increased workload is greater than a predetermined threshold specific to the determined type of the increase workload.

AV. A system comprising: a plurality of servers coupled to each other and housed in a server rack, each of the plurality of servers including one or more central processing units (CPUs); a power distribution unit (PDU) coupled to the plurality of servers, the PDU configured to supply power to the plurality of servers, the PDU capable of supplying power up to a maximum rack power at a maximum rack current; a battery pack coupled to the plurality of servers and the PDU, the battery pack capable of powering the plurality of servers for a certain period of time without the PDU; and a workload monitoring module coupled to the plurality of servers, the PDU, and the battery pack, the workload monitoring module configured to: monitor and predict a workload of each of the plurality of servers, determine an aggregated power required for the plurality of servers based on the predicted workloads, determine whether the aggregated power exceeds the maximum rack power, and control operation of a battery pack based on the aggregated power.

AW. The system as paragraph AV recites, wherein the workload monitoring module is further configured to control the operation of the battery pack to supplement power to the plurality of servers upon determining that the aggregated power exceeds the maximum rack power.

AX. The system as paragraph AW recites, wherein the workload monitoring module is further configured to: determine a discharge current required from the battery pack to supplement sufficient power in addition to the maximum rack power to meet the aggregated power; and set the discharge current from the battery pack to the required discharge current.

AY. The system as paragraph AW recites, wherein the aggregated power for the plurality of servers is calculated based on expected increased power consumption of the one or more CPUs of the plurality of servers running in a turbo mode to meet the predicted respective workload.

AZ. The system as paragraph AW recites, wherein the workload monitoring module is further configured to determine a respective current required for each of the plurality of servers based on the predicted respective workload and a respective associated CPU frequency.

BA. The system as paragraph AV recites, wherein the workload monitoring module is further configured to, upon determining that the aggregated power does not exceed the maximum rack power, cap a rack current from the PDU to the plurality of servers to a value less than the maximum rack current.

BB. The system as paragraph AV recites, wherein the workload monitoring module is further configured to: detect a power outage at the PDU; upon detecting the power outage, determine a respective current required for each of the plurality of servers based on the respective predicted workload; calculate a total discharge current from the battery pack based on the respective currents; and set a maximum discharge current from the battery pack to the total discharge current.

BC. The system as paragraph BB recites, wherein the workload monitoring module is further configured to: set a respective current cap for each of the plurality of servers based on the predicted respective workload and a respective associated CPU frequency.

BD. The system as paragraph AV recites, wherein the PDU is capable of supplying power exceeding the maximum rack power, up to a predetermined excess power, to the plurality of servers for a predetermined period of time, and wherein the workload monitoring module is further configured to: monitor an output power of the PDU, determine whether the output power exceeds the maximum rack power, and control the operation of the battery pack based on the output power.

BE. The system as paragraph BD recites, wherein the workload monitoring module is further configured to: upon determining that the output power exceeds the maximum rack power, operate the battery pack in a discharge mode to meet an excess power required over the maximum rack power, and upon determining that the output power does not exceed the maximum rack power, cap the output power to a value less than the maximum rack power.

BF. The system as paragraph AV recites, wherein the workload monitoring module is further configured to charge the battery pack at a high rate if the monitored workload is low and the predicted workload is high.

BG. A method comprising: monitoring and predicting a workload of each of a plurality of servers housed in a server rack, each of the plurality of servers including one or more central processing units (CPUs); determining an aggregated power required for the plurality of servers based on the predicted workloads; determining whether the aggregated power exceeds a maximum rack power at a maximum rack current available from a power distribution unit (PDU) configured to supply power to the plurality of servers; and controlling operation of a battery pack based on the aggregated power to meet the predicted workloads.

BH. The method as paragraph BG recites, further comprising: controlling the operation of the battery pack to supplement power to the plurality of servers upon determining that the aggregated power exceeds the maximum rack power.

BI. The method as paragraph BH recites, further comprising: determining a discharge current required from the battery pack to supplement sufficient power in addition to the maximum rack power to meet the aggregated power; and setting the discharge current from the battery pack to the required discharge current.

BJ. The method as paragraph BH recites, wherein the aggregated power for the plurality of servers is calculated based on expected increased power consumption of the one or more CPUs of the plurality of servers running in a turbo mode to meet the predicted respective workload.

BK. The method as paragraph BH recites, further comprising: determining a respective current required for each of the plurality of servers based on the predicted respective workload and a respective associated CPU frequency.

BL. The method as paragraph BG recites, further comprising: determining that the aggregated power does not exceed the maximum rack power; and capping a rack current from the PDU to the plurality of servers to a value less than the maximum rack current.

BM. The method as paragraph BG recites, further comprising: detecting a power outage at the PDU; upon detecting the power outage, determining a respective current required for each of the plurality of servers based on the respective predicted workload; calculating a total discharge current from the battery pack based on the respective currents; and setting a maximum discharge current from the battery pack to the total discharge current.

BN. The method as paragraph BM recites, further comprising: setting a respective current cap for each of the plurality of servers based on the predicted respective workload and a respective associated CPU frequency.

BO. The method as paragraph BG recites, further comprising: monitoring an output power of the PDU; determining whether the output power exceeds the maximum rack power; and control the battery pack operation based on the output power; wherein the PDU is capable of supplying power exceeding the maximum rack power, up to a predetermined excess power, to the plurality of servers for a predetermined period of time.

BP. The method as paragraph BO recites, further comprising: upon determining that the output power exceeds the maximum rack power, operating the battery pack in a discharge mode to meet an excess power required over the maximum rack power; and upon determining that the output power does not exceed the maximum rack power, capping the output power to a value less than the maximum rack power.

BQ. A non-transitory computer-readable storage medium storing computer-readable instructions executable by one or more processors, that when executed by the one or more processors, cause the one or more processors to perform operations comprising: monitoring and predicting a workload of each of a plurality of servers housed in a server rack, each of the plurality of servers including one or more central processing units (CPUs); determining an aggregated power required for the plurality of servers based on the predicted workloads, determining whether the aggregated power exceeds a maximum rack power at a maximum rack current available from a power distribution unit (PDU) configured to supply power to the plurality of servers, and controlling operation of a battery pack based on the aggregated power.

BR. The non-transitory computer-readable storage medium as paragraph BQ recites, wherein the operations further comprise: controlling the operation of the battery pack to supplement power to the plurality of servers upon determining that the aggregated power exceeds the maximum rack power.

BS. The non-transitory computer-readable storage medium as paragraph BR recites, wherein the operations further comprise: determining a discharge current required from the battery pack to supplement sufficient power in addition to the maximum rack power to meet the aggregated power; and setting the discharge current from the battery pack to the required discharge current.

BT. The non-transitory computer-readable storage medium as paragraph BR recites, wherein the aggregated power for the plurality of servers is calculated based on expected increased power consumption of the one or more CPUs of the plurality of servers running in a turbo mode to meet the predicted respective workload.

BU. The non-transitory computer-readable storage medium as paragraph BR recites, wherein the operations further comprise: determining a respective current required for each of the plurality of servers based on the predicted respective workload and a respective associated CPU frequency.

BV. The non-transitory computer-readable storage medium as paragraph BQ recites, wherein the operations further comprise: determining that the aggregated power does not exceed the maximum rack power; and capping a rack current from the PDU to the plurality of servers to a value less than the maximum rack current.

BW. The non-transitory computer-readable storage medium as paragraph BQ recites, wherein the operations further comprise: detecting a power outage at the PDU; upon detecting the power outage, determining a respective current required for each of the plurality of servers based on the respective predicted workload; calculating a total discharge current from the battery pack based on the respective currents; and setting a maximum discharge current from the battery pack to the total discharge current.

BX. The non-transitory computer-readable storage medium as paragraph BW recites, wherein the operations further comprise: setting a respective current cap for each of the plurality of servers based on the predicted respective workload and a respective associated CPU frequency.

BY. The non-transitory computer-readable storage medium as paragraph BQ recites, wherein the operations further comprise: monitoring an output power of the PDU; determining whether the output power exceeds the maximum rack power; and control the battery pack operation based on the output power; wherein the PDU is capable of supplying power exceeding the maximum rack power, up to a predetermined excess power, to the plurality of servers for a predetermined period of time.

BZ. The non-transitory computer-readable storage medium as paragraph BY recites, wherein the operations further comprise: upon determining that the output power exceeds the maximum rack power, operating the battery pack in a discharge mode to meet an excess power required over the maximum rack power; and upon determining that the output power does not exceed the maximum rack power, capping the output power to a value less than the maximum rack power.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device for predicting performance and power (PnP) requirements of a host server, the device comprising:
    a big cores module including a plurality of general purpose central processing units (CPUs), the big cores module configured to receive and pre-process PnP metrics data of the host server and to allocate computing resources for calculating the PnP requirements;
    a small cores module including a plurality of massively parallel processing (MPP) units, the small cores module coupled to the big cores module, the small cores module configured to map each instance associated with host server in the PnP metrics data to a corresponding MPP unit based on the allocated computing resources for a per-instance metric calculation; and
    an artificial intelligence (AI) accelerator coupled to the big cores module and the small cores modules, the AI accelerator configured to calculate PnP prediction results based on the per-instance calculations from the small cores module and to send the PnP prediction results to the big cores module.

2. The device of claim 1, wherein the small cores module is further configured to perform rule-based prediction, generate rule-based prediction results, and send the rule-based prediction results to big cores module.

3. The device of claim 1, wherein the big cores module is coupled to the host server via a host interface, the big cores module further configured to send the PnP prediction results to the host server via the host interface.

4. The device of claim 3, wherein a software agent running on the host server is configured to collect the PnP metrics data to be sent to the big cores module and receive the PnP prediction results from the big cores module.

5. A method for predicting performance and power (PnP) requirements of a host server, the method comprising:
    receiving and pre-processing, by a big cores module of a device, PnP metrics data of the host server, the big cores module including a plurality of general purpose central processing units (CPUs);
    allocating, by the big cores module, computing resources for calculating the PnP requirements;
    mapping, by a small cores module of the device, each instance associated with host server in the PnP metrics data to a corresponding massively parallel processing (MPP) unit based on the allocated computing resources for a per-instance metric calculation, the small cores module including a plurality of MPP units;
    calculating, by an artificial intelligence (AI) accelerator of the device, PnP prediction results based on the per-instance calculations from the small cores module; and
    sending, by the AI accelerator, the PnP prediction results to the big cores module.

6. The method of claim 5, further comprising:
    performing, by the small cores module, rule-based prediction to generate rule-based prediction results, and
    sending, by the small cores module, the rule-based prediction results to the big cores module.

7. The method of claim 5, further comprising:
    sending, by the big cores module, the PnP prediction results to the host server via a host interface.

8. The method of claim 5, wherein the device is a hybrid system on chip (SoC).

9. The method of claim 7, further comprising:
    collecting, by a software agent running on the host server, the PnP metrics data to be sent to the big cores module; and
    receiving, by the software agent, the PnP prediction results from the big cores module via the host interface.

10. The method of claim 9, wherein:
    collecting, by a software agent running on the host server, the PnP metrics data to be sent to the big cores module includes collecting the PnP metrics data at a predetermined collection frequency; and
    receiving, by the software agent, the PnP prediction results from the big cores module includes receiving the PnP prediction results from the big cores module at a predetermined receiving frequency.

11. The method of claim 9, further comprising:
    generating, by the software agent, hardware PnP control options and parameters for the hardware PnP control options based on the PnP prediction results.

12. The method of claim 11, further comprising:
    applying, by the software agent, the hardware PnP control options to hardware components of the host server.

13. The method of claim 9, further comprising:
    revising, by the software agent, a scheduler algorithm based on the PnP prediction results.

14. The method of claim 13, further comprising:
    applying, by the software agent, the revised scheduler algorithm to software components of the host server.

15. A non-transitory computer-readable storage medium storing computer-readable instructions executable by one or more processors, that when executed by the one or more processors, cause the one or more processors to perform operations comprising:
  collecting performance and power (PnP) metrics data of a host server;
  transmitting the PnP metrics data, via a host interface, to a big cores module of a device, the big cores module including a plurality of general purpose central processing units (CPUs);
  pre-processing, by the big cores module, the PnP metrics data;
  allocating, by the big cores module, computing resources for calculating the PnP requirements;
  mapping, by a small cores module of the device, each instance associated with host server in the PnP metrics data to a corresponding massively parallel processing (MPP) unit based on the allocated computing resources for a per-instance metric calculation, the small cores module including a plurality of MPP units;
  calculating, by an artificial intelligence (AI) accelerator of the device, PnP prediction results based on the per-instance calculations from the small cores module;
  sending, by the AI accelerator, the PnP prediction results to the big cores module;
  receiving, by the big cores module, the PnP prediction results from the AI accelerator; sending, by the big cores module, the PnP prediction to the host server via the host interface; and
  receiving the PnP prediction results from the big cores module.

16. The non-transitory computer-readable storage medium of claim 15, wherein the operations further comprise:
  generating hardware PnP control options and parameters for the hardware PnP control options based on the PnP prediction results.

17. The non-transitory computer-readable storage medium of claim 16, wherein the operations further comprise:
  applying the hardware PnP control options to hardware components of the host server.

18. The non-transitory computer-readable storage medium of claim 15, wherein the operations further comprise:
  revising a scheduler algorithm based on the PnP prediction results; and
  applying the revised scheduler algorithm to software components of the host server.

19. The non-transitory computer-readable storage medium of claim 15, wherein the operations further comprise:
  performing, by the small cores module, rule-based prediction to generate rule-based prediction results, and
  sending, by the small cores module, the rule-based prediction results to the big cores module.

20. The non-transitory computer-readable storage medium of claim 15, wherein the device is a hybrid system-on-chip (SoC).

* * * * *